(12) United States Patent
Chikamura et al.

(10) Patent No.: US 8,649,439 B2
(45) Date of Patent: Feb. 11, 2014

(54) DECODING CIRCUIT, DECODING DEVICE, AND DECODING SYSTEM

(75) Inventors: Keishi Chikamura, Osaka (JP); Takeshi Tanaka, Osaka (JP)

(73) Assignee: Panasonic Corporation, Osaka (JP)

( * ) Notice: Subject to any disclaimer, the term of this patent is extended or adjusted under 35 U.S.C. 154(b) by 1779 days.

(21) Appl. No.: 11/791,220

(22) PCT Filed: Nov. 15, 2005

(86) PCT No.: PCT/JP2005/020952
§ 371 (c)(1),
(2), (4) Date: May 22, 2007

(87) PCT Pub. No.: WO2006/057182
PCT Pub. Date: Jun. 1, 2006

(65) Prior Publication Data
US 2008/0008244 A1    Jan. 10, 2008

(30) Foreign Application Priority Data

Nov. 26, 2004  (JP) ................................. 2004-342198

(51) Int. Cl.
*H04N 7/12* (2006.01)
(52) U.S. Cl.
USPC .................................................... 375/240.25
(58) Field of Classification Search
USPC ............ 375/240.25, 240.15, 240.16, E70.123
See application file for complete search history.

(56) References Cited

U.S. PATENT DOCUMENTS

| | | | | |
|---|---|---|---|---|
| 5,631,713 A | * | 5/1997 | Hoshino | 348/716 |
| 6,791,625 B1 | | 9/2004 | Kohashi et al. | |
| 6,850,568 B1 | * | 2/2005 | Williams et al. | 375/240.16 |
| 7,756,204 B2 | * | 7/2010 | Kondo et al. | 375/240.16 |
| 7,839,935 B2 | * | 11/2010 | Soh et al. | 375/240.24 |
| 7,916,786 B2 | * | 3/2011 | Soh et al. | 375/240.13 |
| 2004/0086044 A1 | * | 5/2004 | Kondo et al. | 375/240.13 |
| 2005/0281334 A1 | * | 12/2005 | Walker et al. | 375/240.16 |

FOREIGN PATENT DOCUMENTS

| | | |
|---|---|---|
| JP | 2003-259377 | 9/2003 |
| JP | 2004-40512 | 2/2004 |
| WO | 00/36841 | 6/2000 |
| WO | 00/43868 | 7/2000 |
| WO | 03/075580 | 9/2003 |

OTHER PUBLICATIONS

"H.264 AVC Textbook", p. 124 and its Partial English Translation.
ITU-T Recommendation H.264, "Advanced video coding for generic audiovisual services", Mar. 2005.

* cited by examiner

*Primary Examiner* — Beemnet Dada
(74) *Attorney, Agent, or Firm* — Wenderoth, Lind & Ponack, L.L.P.

(57) ABSTRACT

A decoding circuit, a decoding device, and a decoding system are included for decoding a B picture encoded by a direct mode at a high speed. A decoding process of an n-th macroblock is performed in parallel with transfer of a motion vector of an anchor block for an (n+1)-th macroblock to a buffer 106. With this construction, even if the (n+1)-th macroblock is encoded by the direct mode, a motion vector can be immediately calculated using the motion vector of the anchor block for the (n+1)-th macroblock in the buffer 106, when the (n+1)-th macroblock is decoded during a time T2.

3 Claims, 7 Drawing Sheets

DECODING CIRCUIT, DECODING DEVICE, AND DECODING SYSTEM

TECHNICAL FIELD

The present invention relates to a decoding circuit, a decoding device, and a decoding system for sequentially decoding a plurality of macroblocks composing an encoded picture in a predetermined order.

BACKGROUND ART

A "motion-compensated interframe prediction" is one of important elements of a conventional moving image compression encoding/decoding technology. The motion-compensated interframe prediction is a method for detecting how pictures in continuous frames (screens) composing a moving image move, in order to compress the moving image effectively. In a typical moving image compression method such as MPEG (Moving Picture Experts Group) and the like, when the motion-compensated interframe prediction is performed, the following "motion vector" is used. The motion vector indicates, per unit called a "macroblock" made by dividing a picture, to which direction a current picture moves and an amount of the movement of the current picture compared to a macroblock in another picture preceding or succeeding the current picture in a display order. Note that the compared picture is called a "reference picture".

In recent years, MPEG 4-AVC (Advanced Video Coding) has been standardized as a new moving image compression encoding/decoding technology. In MPEG 4-AVC, a "bidirectional motion-compensated interframe prediction" method as an improved motion-compensated interframe prediction is used (refer to a nonpatent document 1).

Here, the bidirectional motion-compensated interframe prediction will be briefly described.

The bidirectional motion-compensated interframe prediction is a method for selecting two arbitrary reference pictures from other pictures preceding or succeeding a current picture in a display order, and performing the motion-compensated interframe prediction using the two reference pictures. Note that a picture, on which the bidirectional motion-compensated interframe prediction is to be performed, is called a "Bi-predictive picture", or a "B picture" for short.

When a B picture is encoded, an encoding mode called a "direct mode" may be used. The direct mode calculates a motion vector of a current macroblock using a motion vector of a reference macroblock that has already been decoded, without encoding the motion vector of the current macroblock. Specifically, if the current macroblock is encoded by the direct mode, the motion vector of the current macroblock is calculated using the motion vector of the reference macroblock on same orthogonal coordinates as the current macroblock in a preceding picture. A conventional process of decoding a macroblock encoded by the direct mode will be briefly described with reference to FIG. 7.

In MPEG, for later decoding of macroblocks encoded by the direct mode, when sequentially decoding macroblocks in a picture, a predetermined amount of motion vectors of decoded macroblocks are stored. For example, according to one specification of MPEG4-AVC, motion vectors of four pictures are stored. In this case, if one picture is composed of 8,160 macroblocks, motion vectors of 32,640 macroblocks in total are required to be stored. A normal buffer is neither sufficient nor practical for storing so many motion vectors in a decoding circuit. Therefore, motion vectors of decoded macroblocks are stored in a memory located outside of the decoding circuit, such as a DRAM (Dynamic Random Access Memory).

Figure 7:
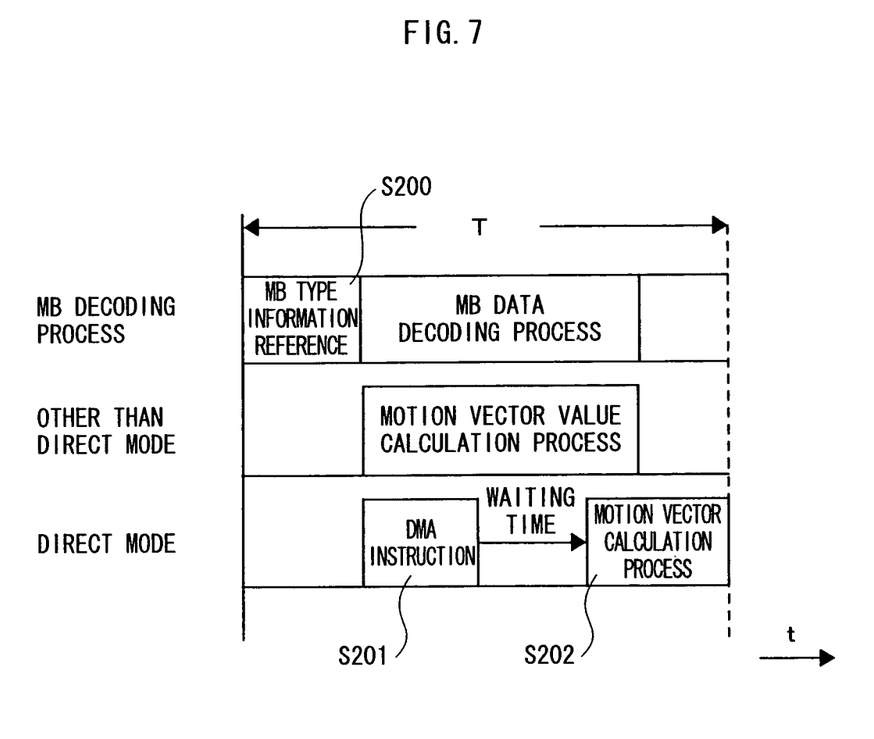
FIG. 7 is a timing chart showing a conventional decoding process.

As shown in FIG. 7, when a macroblock of a B picture is decoded, firstly, macroblock type information included in the head of the macroblock is referenced to judge whether the macroblock is encoded by the direct mode (step S200).

If the macroblock is encoded by the direct mode, a DMA (Direct Memory Access) transfer instruction is performed to obtain a motion vector of a reference macroblock from an external memory (step S201). A motion vector of the macroblock is specified based on the motion vector of the reference macroblock transferred from the external memory as a result of the DMA transfer instruction (step S202).

Nonpatent Document 1: ITU-T Recommendation H.264 "Advanced Video Coding for Generic Audiovisual Services"

DISCLOSURE OF THE INVENTION

Problems the Invention is Going to Solve

However, in the conventional method shown in FIG. 7, after the macroblock is judged as being encoded by the direct mode (step S200), the necessary motion vector of the reference macroblock is obtained by accessing the external memory (step S201). Because it takes time to transfer the motion vector of the reference macroblock from the external memory to the decoding circuit, a waiting time is required as shown by an arrow in FIG. 7. As a result, a total time T for decoding the macroblock of the B picture becomes longer.

A longer total time T for decoding the macroblock of the B picture causes a delay in the decoding of the B picture. This can adversely affect a speed for decoding a whole moving image.

In view of this, a main object of the present invention is to provide a decoding circuit, a decoding device, and a decoding system for decoding a B picture encoded by the direct mode at a high speed.

Means of Solving the Problems

The above-mentioned object can be achieved by a decoding circuit for sequentially decoding a plurality of macroblocks in a predetermined order, the plurality of macroblocks composing a picture that is encoded according to MPEG, the decoding circuit comprising: a transferring unit operable to execute a data transfer with an external memory located outside of the decoding circuit; a buffer operable to hold a motion vector of a reference macroblock, the motion vector of the reference macroblock being to be referenced if a current macroblock has been encoded by a direct mode; a buffer transfer instructing unit operable to instruct the transferring unit to transfer, before decoding of a macroblock preceding the current macroblock ends, the motion vector of the reference macroblock from the external memory to the buffer; a decoding unit operable to, if the current macroblock has been encoded by the direct mode, specify a motion vector of the current macroblock based on the motion vector held in the buffer; and an external memory transfer instructing unit operable to instruct the transferring unit to transfer the specified motion vector to the external memory. Here, the decoding circuit is realized by an integrated circuit, and a buffer capacity of the decoding circuit is limited. Also, the transferring unit is realized by a DMA controller.

Effects of the Invention

With the above-stated construction, even a decoding circuit, which is required to temporarily store a decoded motion vector in an external memory because of a limit of a buffer capacity of the decoding circuit, transfers a motion vector as follows. The decoding circuit transfers a motion vector that will be needed for a macroblock to be decoded, from the external memory to the buffer in the decoding circuit, before decoding of the macroblock is started. This construction is not necessary unless a macroblock is encoded by the direct mode. However, if the macroblock is encoded by the direct mode, a motion vector of the macroblock can be immediately specified when the macroblock starts to be decoded. As a result, if the macroblock is encoded by the direct mode, a time required for decoding the macroblock can be shortened.

Also, the buffer transfer instructing unit instructs the transferring unit to transfer the motion vector of the reference macroblock from the external memory to the buffer, during a period from when decoding of a macroblock immediately preceding the current macroblock begins to when the decoding ends.

With the above-stated construction, while an n-th macroblock is being decoded, a motion vector, to which is referenced when an (n+1)-th macroblock is encoded by the direct mode, is transferred to the buffer in the decoding circuit. Therefore, even if the (n+1)-th macroblock is encoded by the direct mode, a motion vector of the (n+1)-th macroblock can be immediately specified when the (n+1)-th macroblock starts to be decoded. Also, a buffer size in the decoding circuit can be minimized for retaining a motion vector to which is referenced by a succeeding macroblock.

DESCRIPTION OF REFERENCE NUMERALS

10: decoding system
100: decoding circuit
101: stream transfer instructing unit
102: decoding unit
103: DMA controller
104: reference image transfer instructing unit
105: buffer transfer instructing unit
106: buffer
107: external memory transfer instructing unit
108: inverse frequency transformation processing unit
109: motion compensation processing unit
110: intra macroblock processing unit
111: deblock filter processing unit
112: decoded image transfer instructing unit
200: external memory
300: storage medium

BEST MODE FOR CARRYING OUT THE INVENTION

The following describes an embodiment of the present invention, with reference to the attached drawings.

<1. Construction>
<1-1. Construction of a Decoding System 10>

Figure 1:
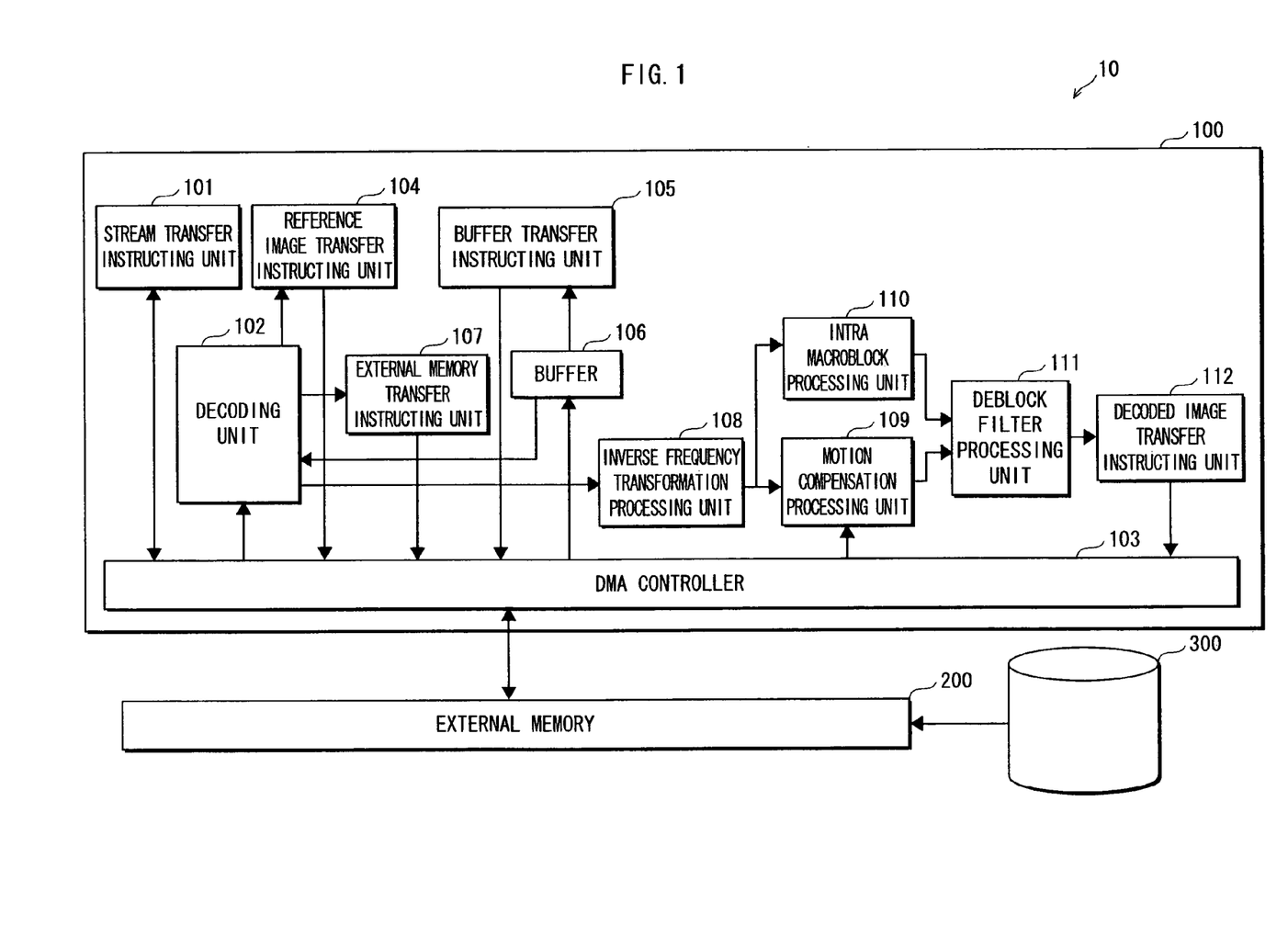
FIG. 1 is a block diagram showing a construction of a decoding system 10 of the present invention.

As shown in FIG. 1, a decoding system 10 includes a decoding circuit 100, an external memory 200 connected to the decoding circuit 100, and a storage medium 300.

The external memory 200 is a writable memory used as a working area such as a DRAM and the like, and temporarily stores data that is necessary for the decoding circuit 100 to perform a decoding process. The decoding circuit 100 will be described later.

The storage medium 300 is a mass storage medium such as a HDD (Hard Disk Drive) and the like, and stores moving image data (hereinafter, referred also to as a "stream") that is encoded according to MPEG. For example, the stream is a TV program recorded by a user.

The decoding circuit 100 is an integrated circuit for decoding a stream that is encoded according to MPEG. The decoding circuit 100 receives a stream sequentially loaded from the storage medium 300 to a working area of the external memory 200, and decodes the stream.

<1-2. Construction of the Decoding Circuit 100>

The decoding circuit 100 includes a stream transfer instructing unit 101, a decoding unit 102, a DMA controller 103, a reference image transfer instructing unit 104, a buffer transfer instructing unit 105, a buffer 106, an external memory transfer instructing unit 107, an inverse frequency transformation processing unit 108, a motion compensation processing unit 109, an intra macroblock processing unit 110, a deblock filter processing unit 111; and a decoded image transfer instructing unit 112.

The stream transfer instructing unit 101 instructs the DMA controller 103 to transfer the stream from the external memory 200 to the buffer 106 described later.

The decoding unit 102 variable-length-decodes the stream that has been variable-length-encoded according to MPEG per macroblock, and outputs a macroblock type, a motion vector, and a pixel residual value of the macroblock. If the macroblock is encoded by a mode other than the direct mode, the motion vector is specified by decoding the macroblock. On the other hand, if the macroblock is encoded by the direct mode, the motion vector is calculated using a motion vector retained in the buffer 106.

The DMA controller 103 transfers data between the external memory 200 and each buffer included in the decoding circuit 100 such as the buffer 106, using a DMA method.

The reference image transfer instructing unit 104 instructs the DMA controller 103 to transfer a reference image indicated by the motion vector outputted from the decoding unit 102, from the external memory 200 to the buffer 106.

The buffer transfer instructing unit 105 instructs the DMA controller 103 to transfer the motion vector of an already decoded macroblock, to which is referenced when the macroblock is encoded by the direct mode, to the buffer 106.

The buffer 106 is a storage area for temporarily storing data in the decoding circuit 100, and has a capacity of storing at least one motion vector of a macroblock. Specifically, the buffer 106 temporarily stores the motion vector outputted from the DMA controller 103 according to the instruction from the buffer transfer instructing unit 105.

The external memory transfer instructing unit 107 instructs the DMA controller 103 to transfer a motion vector specified each time the decoding unit 102 decodes a macroblock, to the external memory 200.

The inverse frequency transformation processing unit 108 inverse-frequency-transforms the pixel residual value outputted from the decoding unit 102 and outputs it.

The motion compensation processing unit 109 combines the pixel residual value outputted from the inverse frequency transformation processing unit 108 with the reference image transferred according to the instruction from the reference image transfer instructing unit 104, and outputs the combined image as a decoded image.

The intra macroblock processing unit 110, if the macroblock is encoded by a mode that does not require an interframe prediction (hereinafter, referred to as an "intra macroblock"), decodes the macroblock using the pixel residual value of the macroblock outputted from the inverse frequency transformation processing unit 108, and outputs the decoded image.

The deblock filter processing unit 111 performs a deblock filter process on the decoded image outputted from any of the motion compensation processing unit 109 and the intra macroblock processing unit 110, in order to reduce block noise.

The decoded image transfer instructing unit 112 instructs the DMA controller 103 to transfer the decoded image on which the deblock filter process has been performed by the deblock filter processing unit 111, to the external memory 200.

<2. Data Structure>

Here, data decoded by the decoding system 10 will be described.

Figure 2:
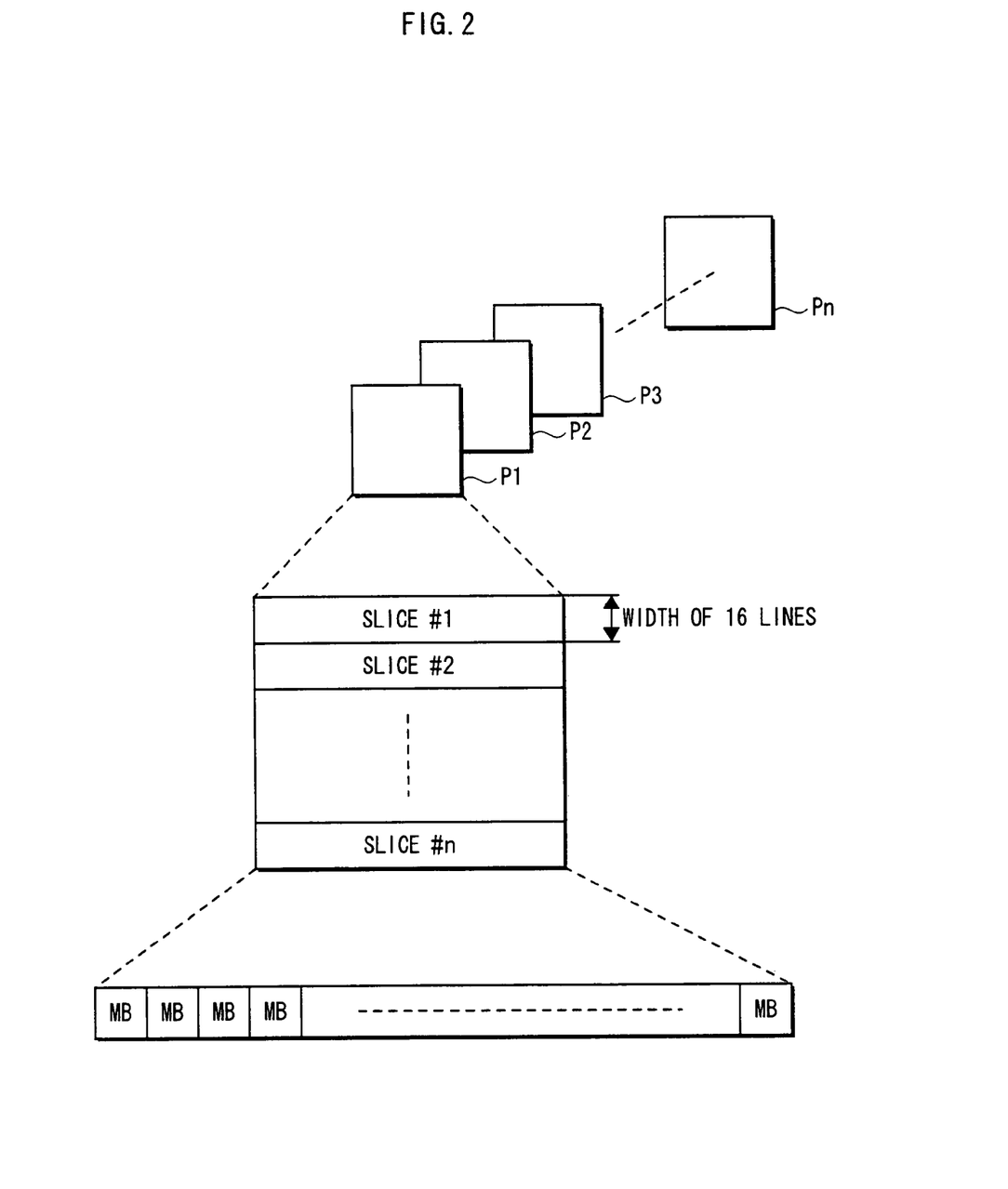
FIG. 2 is a schematic diagram showing a structure of data encoded according to MPEG.

As shown in FIG. 2, a stream encoded according to MPEG is composed of a plurality of pictures (P1, P2, P3, . . . Pn). Each of the plurality of pictures is a still image composing the stream which is a moving image, and corresponds to one screen.

Also, each of the plurality of pictures is divided into slices each having a width of 16 lines in a horizontal direction (slice #1, slice #2, . . . slice #n). A slice is a basic unit for encoding a picture.

Each slice is further divided into macroblocks (hereinafter, referred also to as a "MB" for short). A macroblock is a basic unit for decoding including the motion-compensated interframe prediction. For example, in a case of a HDTV (High Definition Television) quality of MPEG4-AVC (Advanced Video Coding), one picture is divided into 8,160 macroblocks.

Here, a motion vector of a macroblock of a B picture will be described.

The motion vector is information showing to which direction a current picture moves and an amount of the movement of the current picture compared to a macroblock in another picture preceding or succeeding the current picture in a display order. If the macroblock is encoded by a mode other than the direct mode, the motion vector is specified when the macroblock is variable-length-decoded.

On the other hand, if the macroblock is encoded by the direct mode, the motion vector of the macroblock is calculated using a motion vector of another macroblock. In the embodiment, a method of calculating a motion vector in a "temporal direct mode" will be described.

Figure 3:
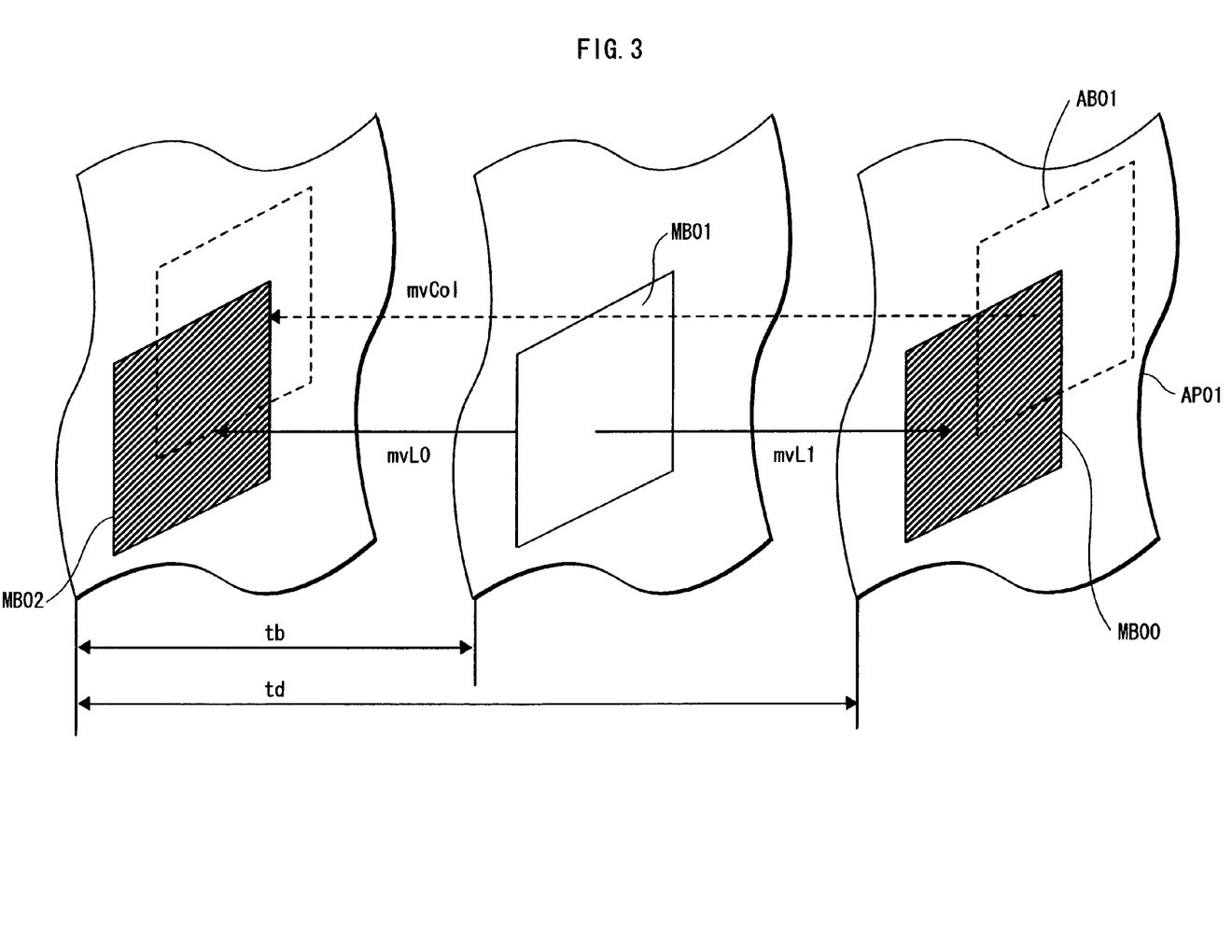
FIG. 3 is a schematic diagram showing a method of calculating a motion vector in a temporal direct mode.

As shown in FIG. 3, in order to calculate a motion vector of a macroblock (MB01) to be decoded, one of two reference pictures (hereinafter, referred to as an "anchor picture") (AP01) for the macroblock to be decoded is referenced. The motion vector of the MB01 is calculated using a motion vector of a macroblock (hereinafter, referred to as an "anchor block") (AB01) on same orthogonal coordinates as the MB01 in the AP01, according to the following formula.

$$mvL0 = mvCol*tb/td \quad \text{[Formula 1]}$$

$$mvL1 = mvL0 - mvCol \quad \text{[Formula 2]}$$

Here, mvCol is a value of the motion vector of the AB01, and indicates to which macroblock in the reference picture the AB01 corresponds. tb is a time interval between the other reference picture and the picture of the MB01. td is a time interval between the other reference picture and the AP01. Values of tb and td are informed from the decoding unit 102. From the formulas 1 and 2, mvL0 and mvL1 as the motion vector of the MB01 are calculated. By mvL0 and mvL1, a macroblock MB00 on the AP01 and a macroblock MB02 on the other reference picture are determined as reference images.

<3. Operation>

Next, an operation of a decoding process of the decoding system 10 will be described.

Figure 4:
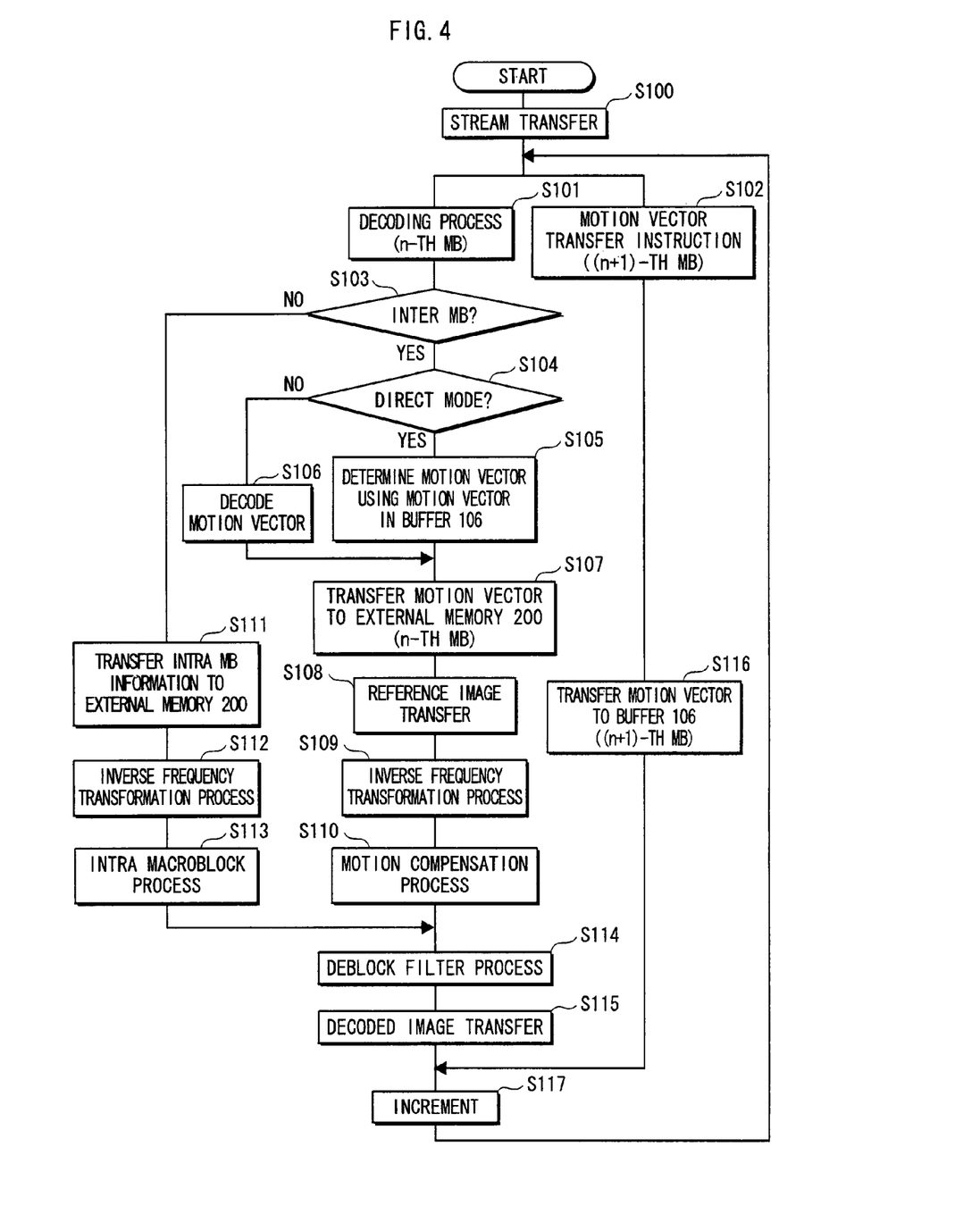
FIG. 4 is a flowchart showing a decoding process operation of the decoding system 10.

As shown in FIG. 4, in the decoding circuit 100, the stream transfer instructing unit 101 instructs the DMA controller 103 to transfer the stream from the external memory 200 to the decoding unit 102. On receiving the instruction, the DMA controller 103 transfers the stream from the external memory 200 to the decoding unit 102 (step S100).

The decoding unit 102 receiving the stream starts a decoding process of a picture composing the stream per macroblock (step S101). Here, a decoding process of an n-th macroblock is started.

In parallel with the decoding process of the n-th macroblock in step S101, the buffer transfer instructing unit 105 instructs the DMA controller 103 to transfer a motion vector of an anchor block to be referenced if an (n+1)-th macroblock succeeding the n-th macroblock is encoded by the direct mode (hereinafter, referred to as an "anchor block for the (n+1)-th macroblock"), from the external memory 200 to the buffer 106 (step S102).

In the decoding process of the n-th macroblock started in step S101, firstly, the decoding unit 102 judges whether the macroblock is a macroblock requiring the interframe prediction (hereinafter, referred to as an "inter macroblock") or a macroblock not requiring the interframe prediction (hereinafter, referred to as an "intra macroblock) by referring to a macroblock header (step S103).

As a result of the judgment in step S103, if the macroblock is the inter macroblock ("YES" in step S103), the decoding unit 102 further judges whether an encoding mode of the n-th macroblock is the direct mode (step S104).

As a result of the judgment in step S104, if the encoding mode of the n-th macroblock is the direct mode ("YES" in step S104), the decoding unit 102 specifies a motion vector of the n-th macroblock using a motion vector stored in the buffer 106 (step S105). The motion vector stored in the buffer 106 here is a motion vector of an anchor block that was transferred in parallel with a decoding process of an (n−1)-th macroblock and is to be referenced if the n-th macroblock is encoded by the direct mode (hereinafter, referred to as an "anchor block for the n-th macroblock").

On the other hand, as a result of the judgment in step S104, if the encoding mode of the n-th macroblock is not the direct mode, the decoding unit 102 specifies the motion vector when variable-length-decoding the n-th macroblock (step S106).

The decoding unit 102 outputs the specified motion vector to a buffer in the external memory transfer instructing unit 107. Then, the external memory transfer instructing unit 107 instructs the DMA controller 103 to transfer the motion vector to the external memory 200 (step S107). Here, the motion vector is transferred so that an address in the external memory 200 to which the motion vector is transferred corresponds to the n-th macroblock.

Then, the reference image transfer instructing unit 104 instructs the DMA controller 103 to transfer a reference image based on the motion vector outputted from the decoding unit 102, from the external memory 200 to a buffer in the motion compensation processing unit 109 (step S108).

During this time, the inverse frequency transformation processing unit 108 inverse-frequency-transforms the pixel residual value outputted from the decoding unit 102 and outputs it (step S109).

The motion compensation processing unit 109 combines the pixel residual value outputted from the inverse frequency transformation processing unit 108 with the reference image transferred via the DMA controller 103 according to the instruction from the reference image transfer instructing unit 104, and outputs the combined image as a decoded image (step S110).

On the other hand, as a result of the judgment in step S103, if the macroblock is the intra macroblock, the decoding unit 102 instructs the DMA controller 103 to transfer information that the macroblock is the intra macroblock, to the external memory 200 (step S111).

The inverse frequency transformation processing unit 108 inverse-frequency-transforms the pixel residual value outputted from the decoding unit 102 and outputs it (step S112).

The intra macroblock processing unit 110 generates a reference image based on an image around the n-th macroblock, adds the reference image to the pixel residual value outputted from the inverse frequency transformation processing unit 108, and outputs the image as a decoded image (step S113).

Then, the deblock filter processing unit 111 performs a deblock filter process on the decoded image outputted in step S110 or step S113 to remove block noise, and outputs the decoded image to a buffer in the decoded image transfer instructing unit 112 (step S114).

The decoded image transfer instructing unit 112 instructs the DMA controller 103 to transfer the decoded image on which the deblock filter process has been performed, to the external memory 2b0 (step S115).

In parallel with the above-mentioned steps S103 to S115, the motion vector of the anchor block for the (n+1)-th macroblock is transferred to the buffer 106 via the DMA controller 103, according to the instruction of transferring the motion vector in step S102 (step S116).

When the decoding process of the n-th macroblock in steps S101 to S116, and the transfer of the motion vector of the anchor block for the (n+1)-th macroblock in steps S102 and S116, which is performed in parallel with the decoding process, are completed, a variable "n" is incremented. Then, a decoding process of the (n+1)-th macroblock and transfer of a motion vector of an anchor block for an (n+2)-th macroblock are started (steps S101 and S102).

According to the above-mentioned embodiment, by using the DMA transfer, the decoding process of the n-th macroblock (steps S103 to S115) is performed in parallel with the transfer of the motion vector of the anchor block for the (n+1)-th macroblock to the buffer 106 (steps S102 and S116). With this construction, even if the (n+1)-th macroblock is encoded by the direct mode, when the (n+1)-th macroblock is decoded, the motion vector can be immediately calculated using the motion vector of the anchor block for the (n+1)-th macroblock in the buffer 106.

Also, an effect of the process of the above-mentioned embodiment will be described by comparing to a conventional process. As shown in FIG. 7, in the conventional process, the macroblock type is judged once (step S200), after the macroblock is judged to be encoded by the direct mode, the DMA controller 103 is instructed to transfer the motion vector (step S201). Therefore, even if the decoding process of the macroblock is completed, it is necessary to wait until the transfer of the macroblock from the external memory 200 is completed. As a result, the total time T required for decoding the macroblock becomes longer.

Figure 5:
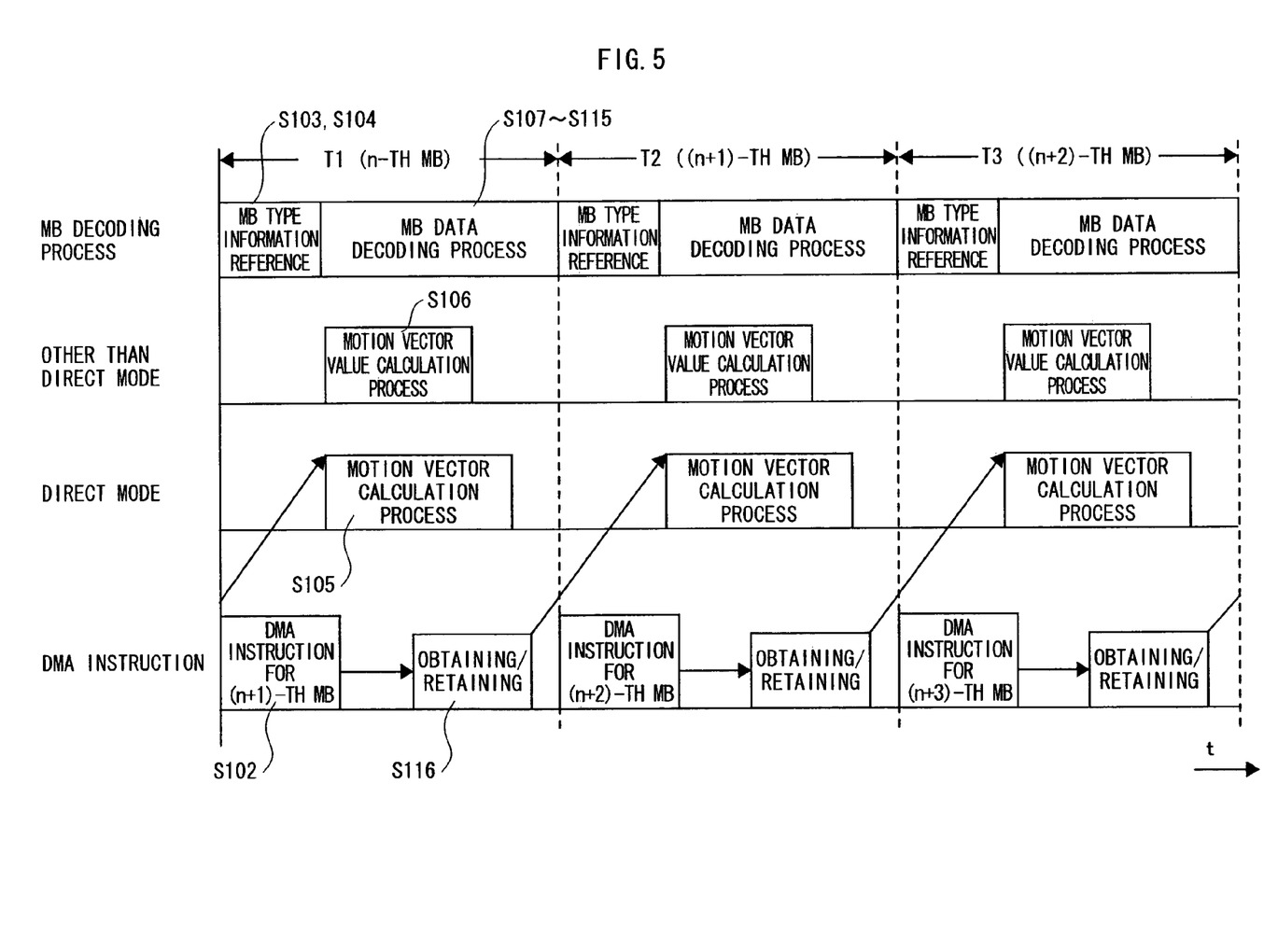
FIG. 5 is a timing chart showing the decoding process operation of the decoding system 10.

On the other hand, as shown in FIG. 5, in the process of the above-mentioned embodiment, the decoding process of the n-th macroblock (steps S103 to S115) is performed in parallel with the transfer of the motion vector of the anchor block for the (n+1)-th macroblock to the buffer 106 (steps S102 and S116). With this construction, even if the (n+1)-th macroblock is encoded by the direct mode, when the (n+1)-th macroblock is decoded during a time T2, the motion vector can be immediately calculated using the motion vector of the anchor block for the (n+1)-th macroblock in the buffer 106. As a result, the time T2 required for decoding the (n+1)-th macroblock can be shortened. This parallel process is repeated by incrementing the variable "n" such as n-th, (n+1)-th, (n+2)-th . . . (n+x)-th in which the stream is ended. Therefore, any macroblock has the same effect.

As described through the embodiment, in the present invention, when each of macroblocks composing a B picture is encoded by the direct mode, each of the macroblocks can be decoded at a high speed. This can speed up decoding of the B picture.

<Modification>

Up to now, the decoding system 10 of the present invention has been described through the embodiment. However, the present invention is not limited to such embodiment.

In the above-mentioned embodiment, in parallel with the decoding process of the current macroblock, the motion vector of the anchor block for the immediately succeeding macroblock is transferred to the buffer 106. However, a plurality of motion vectors of anchor blocks for a plurality of macroblocks succeeding the current macroblock can be collectively transferred, by making a capacity of the buffer 106 larger.

For example, if a memory suitable for transferring continuous data, such as a SDRAM and the like is used as the external memory 200, transfer efficiency may be reduced because a burst length is not reached by transferring the data per one motion vector.

Therefore, if a memory such as the SDRAM and the like is used, in parallel with the decoding process of the n-th macroblock, the motion vector of the anchor block for the (n+1)-th macroblock and the motion vector of the anchor block for the (n+2)-th macroblock can be collectively transferred at the same time.

By increasing a transferred data amount for one DMA transfer, the number of transfer between the external memory 200 and the buffer 106 is reduced. Therefore, transfer efficiency can be improved because a burst length becomes larger.

Note that how many macroblocks succeeding the current macroblock are transferred depends on a size of the buffer 106. In the above-mentioned embodiment, the size of the buffer 106 can be minimum for retaining the motion vector to be referenced by the macroblock immediately succeeding the current macroblock. However, it is not limited to one macroblock as far as the size of the buffer 106 allows.

Also, when the external memory transfer instructing unit 107 instructs to transfer the decoded motion vector to the external memory 200, a plurality of motion vectors of a plurality of macroblocks may be collectively transferred.

<Supplement>

In the above-mentioned embodiment, the "temporal direct mode" is described as the direct mode. However, a "spatial direct mode" may be used.

In other words, if a macroblock is encoded by the spatial direct mode, a motion vector of an anchor block and a motion vector of a macroblock around the macroblock are used for specifying a motion vector of the macroblock.

Figure 6:
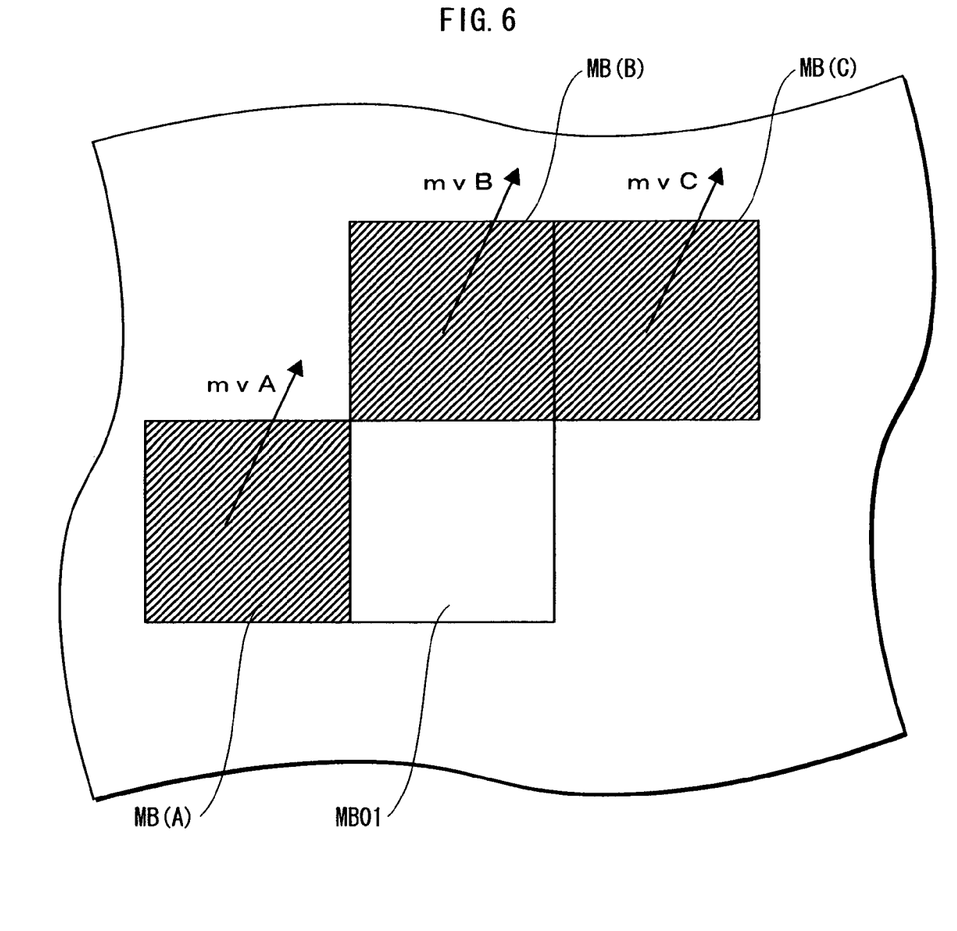
FIG. 6 is a schematic diagram showing a method of calculating a motion vector in a spatial direct mode.

As shown in FIG. 6, in order to calculate a motion vector of a macroblock (MB01) to be decoded, another macroblock that has already been decoded in a picture of the MB01 is referenced. Specifically, the motion vector of the MB01 is calculated according to the following formula using each of motion vectors of a macroblock (MB(A)) located on a left side of the MB01, a macroblock (MB(B)) located on an upper side of the MB01, and a macroblock (MB(C)) located on an upper right side of the MB01.

$$mv = \text{median}(mvA, mvB, mvC) \quad \text{[Formula 3]}$$

Here, mvA is a motion vector of the MB (A). mvB is a motion vector of the MB(B). mvC is a motion vector of the MB(C). From the formula 3, mv as the motion vector of the MB01 is calculated.

Note that if the present invention is applied to the spatial direct mode, in step S102 in the flowchart shown in FIG. 4, the DMA controller 103 may be instructed to transfer each of motion vectors (three motion vectors in total) of macroblocks located on a left side, an upper side, and an upper right side in the picture of the (n+1)-th macroblock to the buffer 106. In this case, a size of the buffer 106 may be fitted to a size for storing the three motion vectors.

INDUSTRIAL APPLICABILITY

The decoding circuit, the decoding device, and the decoding system of the present invention can be applied to a reproducing device for decoding an image encoded according to MPEG, and are useful as a technology for realizing high-speed decoding.

The invention claimed is:

1. A decoding circuit for decoding a current macroblock, the decoding circuit comprising:
   a transferring unit executing a data transfer with an external memory located outside of the decoding circuit, wherein the decoding circuit operates in a plurality of modes, including a direct mode in which the current macroblock to be decoded does not have any motion vectors and a motion vector of the current macroblock is specified using a motion vector of another macroblock that has already been decoded;
   a buffer holding a motion vector of a macroblock;
   a decoding unit judging whether the current macroblock has been encoded by the direct mode and specifying a motion vector of the current macroblock using the motion vector held in the buffer, when the current macroblock has been encoded by the direct mode;
   an external memory transfer instructing unit instructing the transferring unit to transfer the motion vector specified by the decoding unit to the external memory; and
   a buffer transfer instructing unit instructing the transferring unit to transfer a motion vector of a reference macroblock from the external memory to the buffer, before the decoding unit judges whether the current macroblock has been encoded by the direct mode, the reference macroblock being referenced when the current macroblock has been encoded by the direct mode.

2. A decoding device for decoding a current macroblock, the decoding device comprising:
   a transferring unit executing a data transfer with an external memory located outside of the decoding device, wherein the decoding device operates in a plurality of modes, including a direct mode in which the current macroblock to be decoded does not have any motion vectors and a motion vector of the current macroblock is specified using a motion vector of another macroblock that has already been decoded;
   a buffer holding a motion vector of a macroblock;
   a decoding unit judging whether the current macroblock has been encoded by the direct mode and specifying a motion vector of the current macroblock using the motion vector held in the buffer, when the current macroblock has been encoded by the direct mode;
   an external memory transfer instructing unit instructing the transferring unit to transfer the motion vector specified by the decoding unit to the external memory; and
   a buffer transfer instructing unit instructing the transferring unit to transfer a motion vector of a reference macroblock from the external memory to the buffer, before the decoding unit judges whether the current macroblock has been encoded by the direct mode, the reference macroblock being referenced when the current macroblock has been encoded by the direct mode.

3. A decoding system comprising:
   a decoding circuit for decoding a current macroblock and operating in a plurality of modes, including a direct mode in which a current macroblock to be decoded does not have any motion vectors and a motion vector of the current macroblock is specified using a motion vector of another macroblock that has already been decoded; and
   an external memory located outside of the decoding circuit, wherein the decoding circuit comprises:
      a transferring unit executing a data transfer with the external memory;
      a buffer holding a motion vector of a macroblock;
      a decoding unit judging whether the current macroblock has been encoded by the direct mode and specifying a motion vector of the current macroblock using the motion vector held in the buffer, when the current macroblock has been encoded by the direct mode;
      an external memory transfer instructing unit instructing the transferring unit to transfer the motion vector specified by the decoding unit to the external memory; and
      a buffer transfer instructing unit instructing the transferring unit to transfer a motion vector of a reference macroblock from the external memory to the buffer, before the decoding unit judges whether the current macroblock has been encoded by the direct mode, the reference macroblock being referenced when the current macroblock has been encoded by the direct mode.

* * * * *